United States Patent

[11] 3,590,962

| [72] | Inventors | Tommy M. Parker<br>Lakewood;<br>Anthony R. Ford, West Covina, both of,<br>Calif. |
|---|---|---|
| [21] | Appl. No. | 812,504 |
| [22] | Filed | Jan. 6, 1969 |
| [45] | Patented | July 6, 1971 |
| [73] | Assignee | Marvin Dizack, Seymour Grubman, and<br>Stanford Tabb<br>by said Parker |

[54] METERING BRAKE
10 Claims, 9 Drawing Figs.

[52] U.S. Cl. .................................................. 188/111,
188/31, 280/33.99, 188/69
[51] Int. Cl. .................................................. B60t 7/18
[50] Field of Search .................................... 188/31, 60,
69, 111; 280/33.99 C

[56] References Cited
UNITED STATES PATENTS

| 3,002,370 | 10/1961 | La Brie, Jr. | 280/33.99 (C) X |
| 3,029,905 | 4/1962 | Nowak | 280/33.99 C UX |
| 3,174,768 | 3/1965 | Sanders et al. | 280/33.99 (C) |
| 3,366,201 | 1/1968 | Pesta | 280/33.99 (C) X |
| 3,394,945 | 7/1968 | Steier et al. | 280/33.99 (C) |

*Primary Examiner*—George E. A. Halvosa
*Attorney*—Fulwider, Patton, Rieber, Lee and Utecht ABSTRACT: A metering brake including a housing mountable on the frame of a shopping cart wheel. A locking pin projects through the housing and is biased to engage a stop carried on the wheel but is held from such engagement by a pivotal holding bracket. Metering means within the housing includes a cam follower driven by a cam mounted on the wheel and, after a predetermined distance, moves a trip element into engagement with the holding bracket to release the lock pin to engage the stop thereby braking the cartwheel. An actuator is provided for actuating the metering means as the cart leaves the store and reset means is provided for retracting the lock pin and resetting the metering means when the cart is retrieved.

PATENTED JUL 6 1971
3,590,962
SHEET 1 OF 2
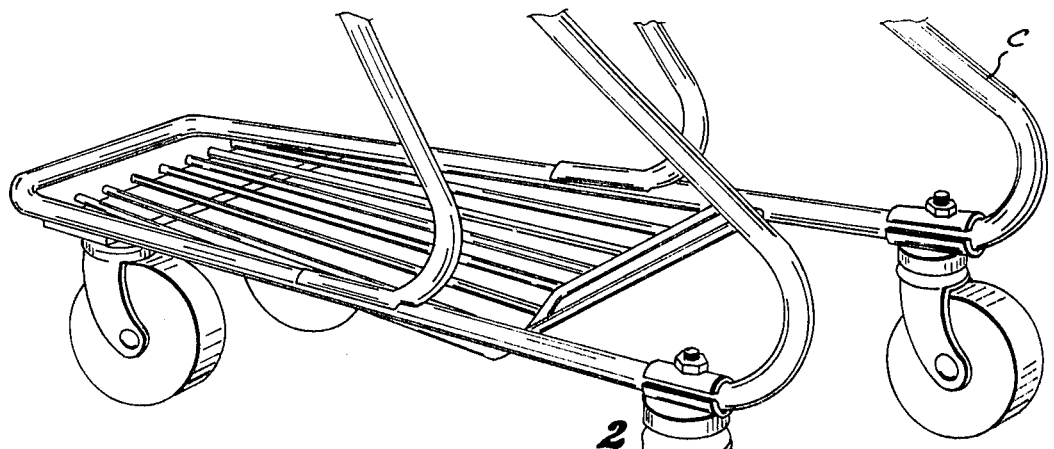
FIG. 1
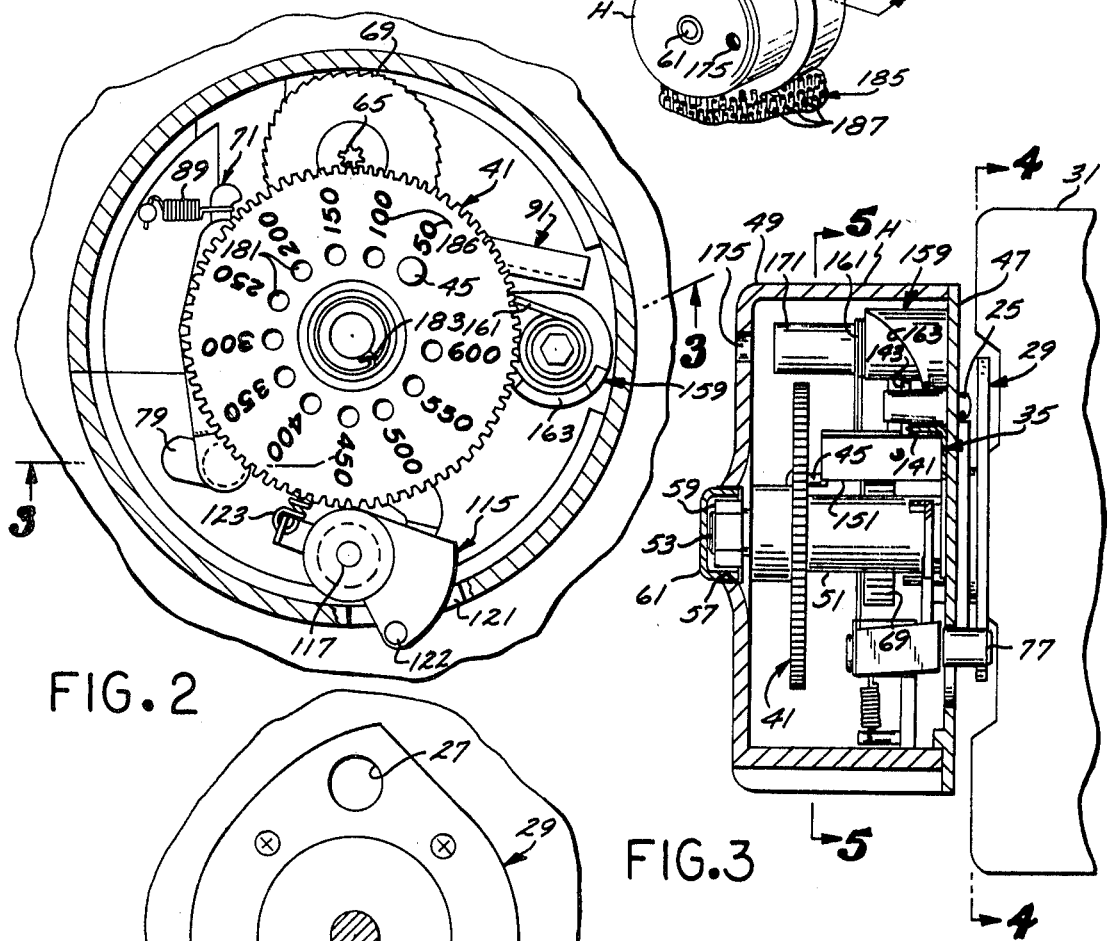
FIG. 2
FIG. 3
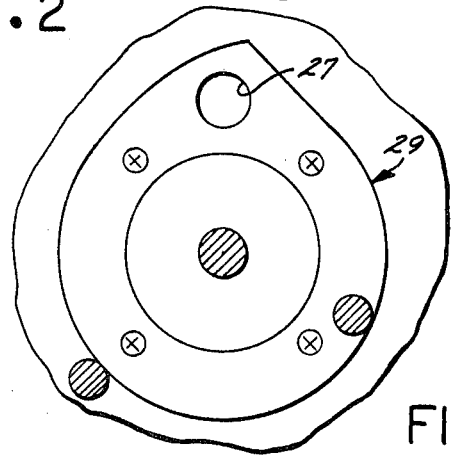
FIG. 4
INVENTORS.
TOMMY M. PARKER
ANTHONY R. FORD
BY Zulwider, Patton, Rieber,
Lee and Utecht
ATTORNEYS INVENTORS.
TOMMY M. PARKER
ANTHONY R. FORD
BY Fulwider, Patton, Rieber,
Lee and Utecht
ATTORNEYS

METERING BRAKE

BACKGROUND OF THE INVENTION

1. Field of the Invention

The present invention relates to shopping cart metering brakes which can be automatically actuated as the cart is pushed out of the store to meter out a predetermined distance and then brake the cart.

2. Description of the Prior Art

Many presently known shopping cart metering brakes cannot be automatically actuated on leaving the grocery store and most are relatively expensive to manufacture.

SUMMARY OF THE INVENTION

The metering brake of the present invention is characterized by a housing attachable to the wheel frame of a shopping cart and mounting a lock biased into engagement with a stop carried on the wheel. A holding bracket maintains the lock normally retracted from engagement with the stop and metering means is provided for actuation after a predetermined distance of cart travel away from the store to engage the holding bracket and release the lock to engage the stop and brake the cart. Reset means is provided to retract the lock and reset the metering means whereby the cart can be freewheeled from the store's parking lot, back to the store and therearound, and when the cart is again wheeled from the store the metering means will be actuated by actuating means at the store door.

Other objects and features of the invention will become apparent from consideration of the following description taken in connection with the accompanying drawings:

DESCRIPTION OF THE DRAWINGS

FIG. 1. is a partial perspective view of a shopping cart having a metering brake embodying the present invention mounted thereon;

FIG. 2. is a horizontal sectional view, in enlarged scale, taken along the lines 2–2 of FIG. 1;

FIG. 3 is a sectional view taken along the lines 3–3 of FIG. 2;

FIG. 4 is a vertical sectional view taken along the lines 4–4 of FIG. 3;

DESCRIPTION OF THE PREFERRED EMBODIMENT

Figure 6:
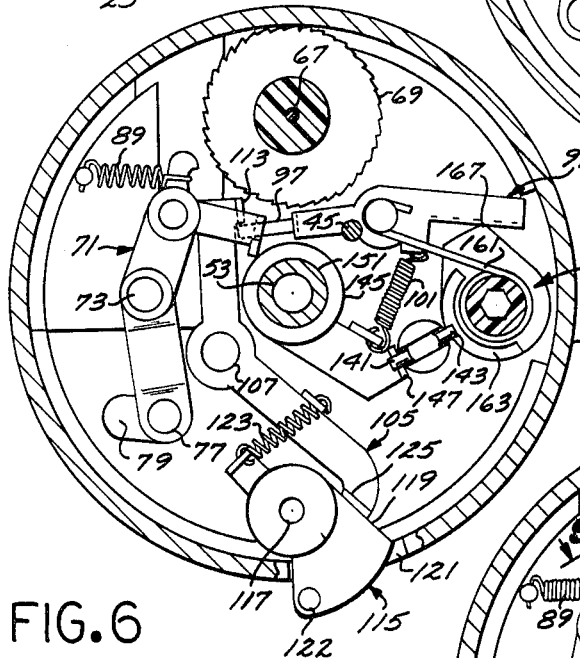
FIG. 6 is a vertical sectional view similar to FIG. 5.

Referring to FIGS. 3, 4 and 6, the metering brake includes a housing H mounted on the fork 21 of a shopping cartwheel frame and includes a lockpin 25 biased axially inwardly into engagement with a bore 27 formed in a cam, generally designated 29, carried on the wheel 31. Still referring to FIG. 6, the lockpin 25 is normally held retracted from engagement with the bore 27 by a holding bracket, generally designed 35. Referring to FIGS. 2 and 3, a ratchet driven metering wheel, generally designated 41 is disposed over the bracket 35 and includes a trip pin 45 projecting axially inwardly therefrom into engageable alignment with the holding bracket 35 whereby, after a predetermined distance, the bracket 35 will be moved from its holding position to enable the lock pin 25 to project into engagement with the bore 27 and brake the wheel 31.

Still referring to FIG. 4, the housing H includes a baseplate 47 and a cup-shaped cover 49. The baseplate 47 is formed on its back side with a radially projecting depression for receiving the fork 21 of the wheel frame and includes a central, outwardly projecting hollow post 51 which receives an elongated axle bolt 53 for mounting the brake on the shopping cart C. The cover 49 is formed with a central bore 57 confronting the bolt 53 whereby the nut 59 can be screwed onto the bolt and a freeze plug 61 pressed into the cover to restrict access to the nut 59 and removal of the brake.

Figure 5:
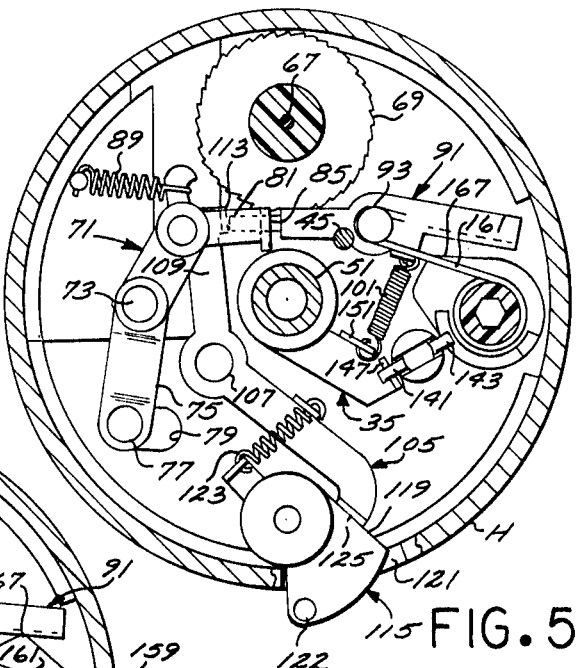
FIG. 5 is a vertical sectional view taken along the lines 5–5 of FIG. 3.
Figure 9:
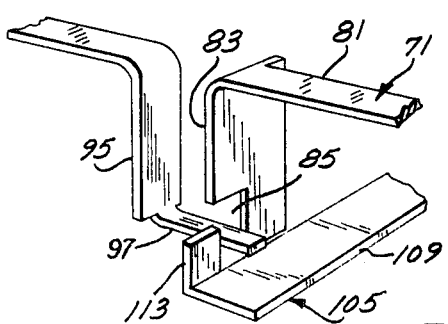
FIG. 9 is a partial perspective view, in enlarged scale, taken along the lines 9–9 of FIG. 7.

Referring to FIGS. 2 and 5, the metering wheel 41 is engaged by a drive pinion 65, such drive pinion being carried on a shaft 67 which is common to a ratchet wheel 69. The ratchet wheel 69 is driven by a drive pawl 71 pivotally mounted to the base 47 by a pivot pin 73. The pawl 71 includes a downwardly projecting portion 75 having a follower pin 77 mounted thereon and projecting axially inwardly through an elongated slot 79 formed in the base 47. The pawl 71 projects upwardly from the pivot pin 73 and includes a rigidly attached portion 81 having an inwardly bent ratchet flange 83 (FIG. 9) that is formed on its extremity with a notch 85, the purpose of which will be made apparent hereinbelow. The pawl 71 is biased counterclockwise by a tension spring 89 and is oscillated by means of the peripheral cam 29 (FIG. 2) which reciprocates the cam follower pin 77 in the slot 79.

A holding pawl, generally designated 91, is pivotally mounted on a pivot pin 93 and is formed with an inwardly bent transverse portion 95 (FIG. 9) and a longitudinally extending tab 97 which is received in the notch 85 of the drive pawl flange 83. Still referring to FIG. 5, the hold pawl 91 is biased clockwise by a tension spring 101 connected to the holding bracket 35 to maintain such bracket biased counterclockwise about the hollow post 51 into holding position with the lockpin 25.

The pawls 71 and 91 are selectively held from engagement with the ratchet wheel 69 by a bellcrank-shaped actuating bracket, generally designated 105, mounted from the base 47 by means of a pivot pin 107. The bracket 105 includes an upwardly projecting portion 109 formed on its upper extremity with an axially outwardly projecting holding flange 113 (FIG. 9) which may be received over the holding pawl tab 97 as shown in FIG. 6. Counterclockwise rotation of the actuating bracket 105 is effected by an actuator, generally designated 115, pivotally mounted from the base 47 by a pivot pin 117. The actuator 115 includes a downwardly projecting web 119 projecting through a slot 121 formed in the housing cover 49 and mounts an axially outwardly projecting striker pin 122 on its forward end. The actuator 115 is biased clockwise by a tension spring 123 which also biases the actuating fitting 105 clockwise. The actuating fitting 105 includes an outwardly projecting flange 125 which is engaged by the back side of the web 119 of the actuator 115.

Figure 8:
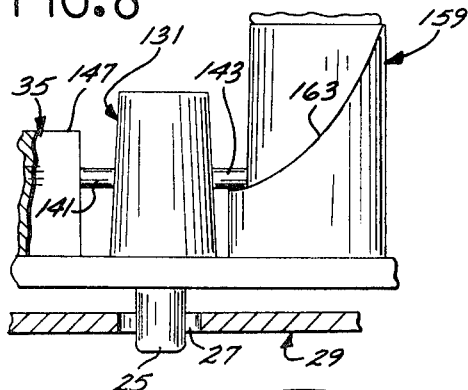
FIG. 8 is a sectional view, in enlarged scale, taken along the lines 8–8 of FIG. 7.

Referring to FIGS. 5 and 8, the lock pin 25 is carried in a cylindrical mount, generally designated 131, having a longitudinal inwardly opening axial passage for receiving such pin, a biasing spring (not shown) being disposed behind such pin to bias it inwardly into engagement with the bore 27 in the cam 29. The mount includes oppositely disposed longitudinal slots 135 and 137 which receive a holding arm 141 and a reset arm 143, respectively, formed by a cross-pin in the lockpin 25.

Figure 7:
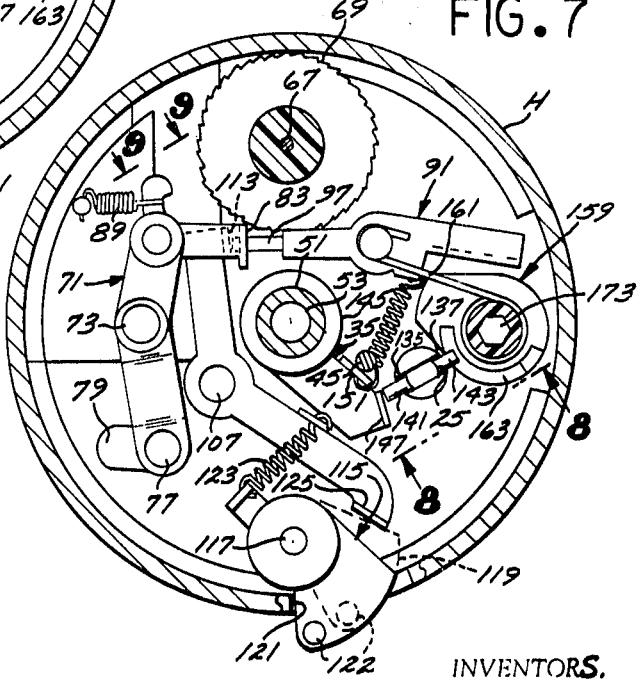
FIG. 7 is a vertical sectional view similar to FIG. 5.

Referring to FIGS. 6 and 7, the holding bracket 35 includes a boss 145 journaled over the central post 51 of the base 47, the bracket projecting radially downwardly from the boss and being formed with an outwardly projecting spacer flange 147 which may be received beneath the hold pin 141 to maintain the lockpin 25 retracted. The hold bracket 35 also includes an outwardly projecting trip flange 151, to which the tension spring 101 is affixed, and which is engaged by the trip pin 45 to rotate the bracket 35 clockwise to retract the flange 147 from engagement under the hold arm 141.

Referring to FIGS. 6 and 8, a reset cam, generally designated 159, is pivotally mounted on the base 47 and is urged clockwise by a torsion spring 161 affixed thereto and hooked on its extending end over the pawl pivot pin 93. The exterior wall of the cam 159 is formed with a peripheral inclined ramp, or wedge, surface 163 which is engaged beneath the reset arm 143 of the lock pin 25 and progressively retracts such pin as the cam is rotated clockwise. Referring to FIG. 6, the cam 159 also includes a projecting cam surface 167 for engaging the right-hand end of the hold pawl 91 to rotate such pawl counterclockwise thereby disengaging both pawls 91 and 71 from the ratchet wheel 69 to free the metering wheel 41 to assume a zero setting. Projecting outwardly from the cam 159 is a boss 171 formed with a hexagonal open ended passage 173 which receives an Allen wrench (not shown) for rotating such cam to reset the subject brake. Referring to FIGS. 1 and 3, an access opening 175 is formed in the cover 49 to confront the passage 173 and admit the reset wrench.

Referring to FIG. 2, the metering wheel 41 has plurality of pin receiving bores 181 arranged in a circle for selectively receiving the trip pin 45. Indicia 186 is marked on the wheel 41 to indicate the distance which will be metered by the brake when the pin 45 is inserted in the bore 181 corresponding with a particular setting. A torsion spring 183 couples the metering wheel 41 with the central post 51 to bias such wheel to a zero setting when the pawls 71 and 91 are disengaged from the ratchet wheel 67.

In operation at mat 185 (FIG. 1) having relatively stiff bristles 187 is placed in the pathway through the exit door of the grocery store in such a manner that the cart C cannot be removed through such door without running the wheel 31 thereover. In the neutral, or nonmetering, condition of the brake, the actuator fitting 105 is in the position shown in FIG. 6 and as the wheel 31 passes over the mat 185 the bristles 187 engage the striker pin 122 and push the actuator 115 rearwardly and upwardly against the actuator fitting 105, as shown in FIG. 7, to rotate such fitting counterclockwise thereby moving the holding flange 113 forwardly to clear the end of the holding pawl tab 97 enabling such pawl to rotate counterclockwise under the bias of the spring 101 to move such pawl into engagement with the ratchet wheel 69. With the holding pawl 91 engaging the ratchet wheel 69 as shown in FIG. 7, its tab 97 is positioned in the path of the actuator flange 113 thereby blocking the actuator from clockwise rotation to its neutral position shown in FIG. 6. Upward rotation of the holding pawl tab 97 under the influence of the actuator 115 also enables the drive pawl 71 to rotate counterclockwise moving the drive flange 83 into engagement with the ratchet wheel 69. As travel of the cart C is continued on into the parking lot, the periphery of the cam 29 (FIGS. 3 and 4) will oscillate the cam follower 77 (FIGS. 5 and 7) forwardly and rearwardly in the slot 79 to feed the ratchet wheel 69 counterclockwise thereby rotating the metering wheel 41 clockwise.

After the wheel 31 has traveled a predetermined distance, which distance would normally be sufficient to transport the cart C to the corner of the parking lot furtherest from the door of the store, the limit pin 45 in the metering wheel 41 will be moved into engagement with the trip flange 151 (FIG. 3) of the holding bracket 35 to rotate the holding bracket counterclockwise against the bias of the spring 101 to the position shown in FIG. 7. Such rotation of the holding bracket 35 will move the spacer flange 147 from beneath the holding arm 141 projecting from the lockpin 25 thereby releasing such pin to be biased inwardly into engagement with the bore 27 (FIGS. 2 and 8) of the cam 29 thereby locking the wheel 31 against rotation in either direction. Thus, for an individual to move the cart c further, he would have to tilt such cart in a manner to hold the braked wheel 31 off the ground thereby making his efforts obvious to passersby.

When the store employee retrieves the cart C, he will retract the lockpin 25 and reset the metering wheel 41 by inserting an Allen wrench through the bore 175 in the housing cover 49 and into the passageway 173 of the cam 159, rotating such cam clockwise to the position shown in FIG. 6. Such clockwise rotation of the cam 159 moves the cam surface 167 against the right-hand end of the holding pawl 91 to rotate such pawl counterclockwise to the position shown in FIG. 6. Counterclockwise rotation of the pawl 91 lowers the left-hand end of such pawl to move the tab 97 downwardly thereby retracting the drive pawl 71 downwardly away from the ratchet wheel 69 and moving the tab 97 from the path of the flange 113 on the actuating bracket 105. When the tab 97 clears the holding flange 113 the actuating bracket 105 will rotate clockwise under the influence of the spring 123 to the neutral position shown in FIG. 6 to bring the flange 113 into position overlying the tab 97 thereby holding such tab 97 downwardly and maintaining the pawls 71 and 91 out of engagement with the ratchet wheel 69. Such disengagement of the pawls 71 and 91 frees the ratchet wheels 69 to rotate clockwise thereby enabling the metering wheel 41 to return to its zero position under the bias of the torsion spring 183. Counterclockwise rotation of the reset cam 159 also moves the raised portion of the wedge surface 163 (FIG. 8) under the lifting arm 143 to raise such arm upwardly thereby retracting the lockpin 25 and elevating the oppositely disposed holding pin 141 sufficiently to clear the spacer flange 147 carried on the holding fitting 35 to free such fitting to rotate counterclockwise moving the flange 147 under the holding arm 143 as shown in FIG. 6 thereby maintaining the lockpin 25 retraced after the reset cam 159 is permitted to rotate back to its normal position shown in FIG. 5. The wheel 31 can then rotate freely enabling the cart to be returned to the store and placed at a convenient location for access by a customer entering the store and such customer may push the cart around the store and, after checking out, as he passes through the doorway and over the mat 185 the brake will again be actuated.

It will be apparent from the foregoing that the brake of present invention may be set to numerous different metering distances by merely relocating the trip pin 45 in different ones of the receiving bores 181 whereby the same brake may be utilized for numerous different grocery stores having differently sized parking lots thereby avoiding the expense of manufacturing a special brake for each store. Further, the overall length of the brake is relatively small thereby avoiding the danger of having a brake projecting for some distance from the wheel 31 and of tripping customers or knocking over various stacks of merchandise as the cart C is wheeled around the store. Also, the brake locks the wheel 31 against rotation in either direction thereby avoiding unauthorized removal of the cart C from the store parking lot by merely running the wheel 31 backwards.

Various modifications and changes may be made with regard to the foregoing detailed description without departing from the spirit of the invention or the scope of the following claims.

We claim:

1. A metering brake to be coupled with a support wheel of a shopping cart, or the like, and to be actuated by an actuating device, said brake comprising:
   drive means for being coupled with said support wheel;
   stop means for being mounted on said support wheel;
   a relatively compact housing for being mounted from said cart adjacent said wheel;
   lock means carried from said housing for being moved into engagement with said stop means;
   metering means in said housing and connected with said drive means;
   trip means engageable by said metering means to actuate said lock means to engage said stop means; and
   an actuator carried by said housing and responsive to said brake passing adjacent said actuating device to actuate said metering means whereby said cart may be propelled past said actuating device to cause the actuator means to actuate said metering means to, after said support wheel has traveled a predetermined distance, actuate said trip means to trip said locking means to engage said stop means and restrict further rotation of said support wheel.

2. A metering brake as set forth in claim 1 wherein:
   said metering means includes a metering wheel including a plurality of peripherally spaced holes; and
   said trip means includes distance selecting pin means selectively insertable in said respective holes to engage said locking means when said support wheel has traveled different distances after passing said actuating device depending on which hole said pin means is inserted in.

3. A metering brake as set forth in claim 1 wherein:

said lock includes a mounting fitting mounted on said housing and formed with a central passage having longitudinal slots in opposite sides thereof, a locking pin slidably received in said passage and including a lifting arm projecting from one side and through one of said slots and a holding arm projecting from one side and through one of said slots and a holding arm projecting from its opposite side and through said other slot and projecting from said fitting;

said locking means includes a lockpin biased into engagement with said stop means and a holder including a bracket pivotally mounted on said housing and formed with a spacer flange for receipt under said holding arm; and said brake includes said reset means including a reset cam pivotally mounted on said housing and formed with an inclined cam surface disposed under said lifting arm whereby said cam may be rotated to engage said lifting arm and raise said lockpin sufficiently to disengage said lockpin from said stop and enable said spacer flange to be moved under said holding arm to hold said lockpin disengaged from said stop.

4. A metering brake as set forth in claim 1 wherein:

said lock means includes lockpin means for engaging said stop means, biasing means biasing said pin means into engagement with said stop means, a pivotable holder for normally holding said lockpin means out of engagement with said stop means; and said trip means includes a trip pin for engaging said holder and pivoting it out of engagement with said lockpin means to free said lockpin means to be biased into engagement with said stop means.

5. A metering brake as set forth in claim 1 wherein:

said metering means includes a ratchet wheel rotatably mounted on said housing and coupled with said drive means and coupled with said trip means, a holding pawl for restricting rotation of said ratchet wheel in one direction and a drive pawl carried from said housing and pivotable to engage said ratchet wheel and rotate it in the direction opposite said one direction; and said drive means includes cam means mounted on said wheel for engaging said drive pawl a selected number of times each revolution of said support wheel to rotate said drive pawl and advance said ratchet wheel in said direction opposite said one direction.

6. A metering brake as set forth in claim 5 wherein:

said metering means includes biasing means urging said pawls into engagement with said ratchet wheel;

said actuating means includes an actuating bracket pivotally mounted from said housing and formed with flange means pivotable into engagement with said pawls to hold them out of engagement with said ratchet wheel; and said actuator is operable on said bracket to pivot said bracket and move said flange means out of engagement with said pawls to enable said biasing means to engage said pawls with said ratchet wheel.

7. A metering brake as set forth in claim 1 wherein:

said stop means includes plate means for being nonrotatably mounted on said support wheel and formed with a lockpin-receiving opening; and said lock means includes a lockpin for engaging in said opening to lock said support wheel against rotation in either direction.

8. A metering brake as set forth in claim 7 wherein:

the periphery of said plate means is contoured to form a projection;

said drive means includes a cam follower for following the periphery of said plate means; and said metering means includes ratchet means connected with said cam follower and driven thereby.

9. A metering brake as set forth in claim 8 wherein:

said lock means includes biasing means for biasing said lockpin into engagement in said opening and said lockpin includes a pair of transversely projecting arms;

said brake includes a pivotable holder mounted from said housing and including flange means for engagement under one of said arms to hold said lockpin in engagement with said stop means; and reset means including reset cam means for engagement with the other of said arms and manually rotatable to retract said lockpin from said opening to enable said holder to be pivoted to pivot said flange means in engagement with said one of said arms to limit movement of said lockpin toward said hole.

10. A metering brake as set forth in claim 8 wherein:

said metering means includes a ratchet wheel and a pair of cooperating pawls biased into engagement with said ratchet wheel and connected with said cam follower; and said actuator includes a pivotable actuator bracket carried from said housing for normally engaging said pawls to hold them out of engagement with said ratchet wheel and responsive to actuation of said actuator to release said pawls for engagement with said ratchet wheel.